US008109171B2

(12) United States Patent
Nakao et al.

(10) Patent No.: US 8,109,171 B2
(45) Date of Patent: Feb. 7, 2012

(54) PARALLEL MECHANISM

(75) Inventors: Takashi Nakao, Kyoto (JP); Tatsuhiko Nishida, Kyoto (JP); Hideaki Nakanishi, Kyoto (JP); Daigoro Nakamura, Kyoto (JP)

(73) Assignee: Murata Machinery Ltd., Kyoto (JP)

( * ) Notice: Subject to any disclaimer, the term of this patent is extended or adjusted under 35 U.S.C. 154(b) by 400 days.

(21) Appl. No.: 12/514,661

(22) PCT Filed: Sep. 14, 2007

(86) PCT No.: PCT/JP2007/067937
§ 371 (c)(1),
(2), (4) Date: May 13, 2009

(87) PCT Pub. No.: WO2008/059659
PCT Pub. Date: May 22, 2008

(65) Prior Publication Data
US 2010/0037721 A1 Feb. 18, 2010

(30) Foreign Application Priority Data

Nov. 15, 2006 (JP) ................................. 2006-308546

(51) Int. Cl.
*B25J 17/02* (2006.01)
(52) U.S. Cl. ...................................... 74/490.03; 267/69
(58) Field of Classification Search ............... 74/490.03, 74/490.06, 490.1, 490.05, 490.01; 901/27–29, 901/15; 414/735, 917, 729; 267/69–74
See application file for complete search history.

(56) References Cited

U.S. PATENT DOCUMENTS

| | | | | |
|---|---|---|---|---|
| 5,237,887 A | * | 8/1993 | Appleberry | ................ 74/490.03 |
| 5,333,514 A | | 8/1994 | Toyama et al. | |
| 5,386,741 A | * | 2/1995 | Rennex | ....................... 74/490.05 |
| 6,095,011 A | * | 8/2000 | Brogårdh | ................... 74/490.03 |
| 6,419,211 B1 | | 7/2002 | Hvittfeldt et al. | |
| 7,478,576 B2 | * | 1/2009 | Rosheim | ..................... 74/490.06 |
| 2005/0177279 A1 | | 8/2005 | Osten | |

FOREIGN PATENT DOCUMENTS

| | | |
|---|---|---|
| CN | 2327588 Y | 7/1999 |
| GB | 1155132 A | 6/1969 |
| JP | 8-403 | 2/1996 |
| JP | 3050992 | 3/2000 |
| JP | 2002-529258 | 9/2002 |

OTHER PUBLICATIONS

Supplementary European Search Report for European Patent App. No. 07807341.8 (Nov. 10, 2009).
International Preliminary Report on Patentability and Written Opinion of the International Searching Authority for PCT Patent App. No. PCT/JP2007/067937 (May 26, 2009).
International Search Report for PCT Patent App. No. PCT/JP2007/067937 (Nov. 6, 2007).

* cited by examiner

*Primary Examiner* — Robert Pezzuto
(74) *Attorney, Agent, or Firm* — Cermak Nakajima LLP; Tomoko Nakajima

(57) ABSTRACT

An end effecter is positioned with high precision by stabilizing its attitude. Included are arms each having a pair of rods arranged in parallel, a bracket having the end effecter attached thereto and retained by the pair of rods, ball joints and each including a first joint element having a ball and displaceably connecting the bracket with the arm and a second joint element having a socket for retaining the ball, a connecting member for connecting the pair of parallel rods together and restricting rotation of the rods about an axis that is parallel to the longitudinal direction thereof, and a biasing member for providing a biasing force for retaining the ball in the socket.

14 Claims, 8 Drawing Sheets

PARALLEL MECHANISM

This application is a national phase entry under 35 U.S.C. §371 of PCT Patent Application No. PCT/JP2007/067937, filed on Sep. 14, 2007, which claims priority under 35 U.S.C. §119 to Japanese Patent Application No. 2006-308546, filed Nov. 15, 2006, both of which are incorporated by reference.

TECHNICAL FIELD

The present invention relates to a parallel mechanism having a plurality of arms aligned in parallel.

BACKGROUND ART

A parallel mechanism is a manipulator that is capable of operating at high speed with high precision and is lightweight and highly rigid, as compared to a serial mechanism employing serial arms. Related art for such a parallel mechanism is described in Patent documents 1 and 2 shown below. Parallel mechanisms described in these patent documents have three arms in total. Each arm has a pair of rods arranged parallel to one another. A motor is connected to a base end portion of the arm in such a manner that power can be transmitted, and a bracket is attached to a free end portion of the arm. An end effecter can be attached to the bracket. For example, a hand can be used as the end effecter.

The motor rotates to operate each arm, and thereby move the end effecter to a given position. Here, the rods and the bracket of each arm are connected via ball joints, and therefore the bracket can move in three dimensions with respect to the arm. Also, as shown in FIG. 5 of Patent document 1, a pair of rods is configured so as to be pulled closer to each other by a spring, and thus a ball portion and a socket portion of the ball joint are connected so as not to be disengaged from each other. In this manner, when the motor rotates to operate the arm, the bracket is not disengaged from each rod.

In the foregoing related art, each hook provided at opposite ends of the spring is simply hooked on each rod. The spring hook has poor durability, and therefore when the arm is continually operated, the hook might be broken due to fatigue. Also, in this configuration, since the spring hook is simply hooked on the rod, there is scope for the rod to rotate about an axis that is parallel to its longitudinal direction. Accordingly, when operating the arm, the rods are inevitably caused to rotate about the axis, resulting in an increased amount of movement of the socket portion with respect to the ball portion at the ball joint. Therefore, the ball joints, which are made of synthetic resin, deteriorate quickly due to abrasion of the ball portion and the socket portion, and such abrasion of the ball joints leads to unstable attitude control of the end effecter (bracket). This results in a problem in that the end effecter is not positioned with high precision. Patent document 3 also describes a manipulator structure. This structure addresses the problem of the spring hook being broken due to fatigue, but it does not address any problem caused by rotation of the rod about the axis that is parallel to a longitudinal direction of the rod.

Patent document 1: Japanese Utility Model Application Laid-Open Publication No. H8-403

Patent document 2: Japanese Patent No. 3050992

Patent document 3: Japanese Unexamined Patent Application Publication No. 2002-529258

DISCLOSURE OF THE INVENTION

Problems to be Solved by the Invention

The problem to be solved by the present invention is to position an end effecter with high precision by stabilizing its attitude.

Solution to the Problems

To solve the above problem, the present invention provides a parallel mechanism, including:

arms each being capable of swingably pivoting on a base end portion and including a pair of rods aligned in parallel in a longitudinal direction of the rod;

a bracket having an end effecter attached thereto, the bracket being retained between the pair of rods at a free end portion of the arms;

a pair of ball joints for displaceably connecting the bracket with the arms, the ball joints each including a first joint element having a ball and provided to one of the rod and the bracket, and a second joint element having a socket for retaining the ball and provided to the other of the rod and the bracket;

a connecting member for connecting the pair of parallel rods, and restricting rotation of each rod about an axis that is parallel to the longitudinal direction of the rod; and a biasing member for providing a biasing force to retain the balls in the sockets at the ball joints.

Preferably, the biasing force of the biasing member is limitedly effected only in one direction.

Preferably, the connecting member includes:

a first connecting member attached to one of the pair of rods such that the first connecting member can swingably pivot on a first axis that is perpendicular to the longitudinal direction of the rod;

a second connecting member attached to the other of the pair of rods such that the second connecting member can swingably pivot on a second axis that is parallel to the first axis;

a piston rod portion fixed to the first connecting member; and a cylinder portion fixed to the second connecting member, the cylinder portion having the piston rod portion inserted thereinto movabley in the axial direction of the piston rod portion.

The biasing member is a coil spring provided to wrap around the circumference of the piston rod portion, the coil spring being compressed to pull the pair of rods closer to each other, thereby retaining the ball in the socket at each of the ball joints.

Preferably, the connecting member includes:

a portion attached to one of the pair of rods such that the portion can swingably pivot on the first axis that is perpendicular to the longitudinal direction of the rod; and a portion attached to the other of the pair of rods such that the portion can swingably pivot on the second axis that is parallel to the first axis.

Provided at the ball joints are:

the second joint elements each being fixed to each rod, and the first joint elements each including a cylinder portion fixed to the bracket, and a piston rod portion inserted into the cylinder portion movably in its axial direction.

The biasing member is a coil spring contained in a cylinder chamber of the cylinder portion, the coil spring expanding to bias the first joint elements away from each other, thereby retaining the ball in the socket at each of the ball joints.

Preferably, the connecting member includes:
a portion attached to one of the pair of rods such that the portion can swingably pivot on the first axis that is perpendicular to the longitudinal direction of the rod; and
a portion attached to the other of the pair of rods such that the portion can swingably pivot on a second axis that is parallel to the first axis.

The first and second joint elements are provided at the ball joints, the first joint elements each being fixed to the bracket, the second joint elements each being fixed to the rod, and at least one of the second joint elements fixed to the pair of rods is provided with the socket in a movable manner such that the socket is biased by the coil spring serving as a biasing member, the coil spring expanding to push the movable socket upon the ball, thereby retaining the ball in the socket at each of the ball joints.

Preferably, the connecting member includes:
a first connecting member attached to one of the pair of rods such that the first connecting member can swingably pivot on the first axis that is perpendicular to the longitudinal direction of the rod;
a second connecting member attached to the other of the pair of rods such that the second connecting member can swingably pivot on the second axis that is parallel to the first axis;
a piston rod portion fixed to the first connecting member; and
a cylinder portion fixed to the second connecting member, the cylinder portion having the piston rod portion inserted thereinto movably in its axial direction.

The biasing member is a coil spring provided to wrap around the circumference of the piston rod portion, the coil spring expanding to pull the pair of rods closer to each other, thereby retaining the ball in the socket at each of the ball joints.

Preferably, the connecting member includes a pair of connecting members supported such that the pair of connecting members can swingably pivot relative to each other in a direction perpendicular to the longitudinal direction of the pair of rods.

A first one of the pair of connecting members is attached to one of the pair of rods such that the first connecting member can swingably pivot on the first axis that is parallel to a direction that is perpendicular to the longitudinal direction of the rod.

A second one of the pair of connecting members is attached to the other of the pair of rods such that the second connecting member can swingably pivot on the second axis that is parallel to the first axis.

The biasing member is a coil spring having one end attached to the first connecting member such that the spring can swing around a third axis that is parallel to the first axis and having the other end attached to the second connecting member such that the spring can swing around a fourth axis that is parallel to the second axis.

The coil spring is compressed to place all of the first, second, third, and fourth axes on a straight line, and thereby pulls the pair of rods closer to each other, so that the ball is retained in the socket at each of the ball joints.

Preferably, the connecting member includes a pair of connecting members supported such that the connecting members can swingably pivot relative to each other in a direction perpendicular to the longitudinal direction of the pair of rods.

A first one of the pair of connecting members is attached to one of pair of rods such that the first connecting member can swingably pivot on the first axis that is parallel to a direction that is perpendicular to the longitudinal direction of the rod.

A second one of the pair of connecting members is attached to the other of the pair of rods such that the second connecting member can swingably pivot on the second axis that is parallel to the first axis.

The biasing member is a torsion coil spring having one end attached to the first connecting member such that the spring can swing around a third axis that is parallel to the first axis and having the other end attached to the second connecting member such that the spring can swing around a fourth axis that is parallel to the second axis.

Both ends of the torsion coil spring draw each other to place all of the first, second, third, and fourth axes on a straight line, thereby pulling the pair of rods closer to each other, so that the ball is retained in the socket at each of the ball joints.

EFFECT OF THE INVENTION

A parallel mechanism according to the present invention includes a connecting member for connecting together a pair of rods arranged in parallel. The connecting member restricts rotation of the rods about an axis that is parallel to a longitudinal direction of the rod. Thus, the rotational swing of the rods in their longitudinal directions can be restricted and inhibited. Accordingly, when operating the arms, rotation of the rods about the axis is restricted, resulting in an extremely reduced amount of movement of the socket portion with respect to the ball portion at each ball joint. Therefore, even if the ball joints are made of synthetic resin, deterioration due to abrasion of the ball portion and the socket portion is significantly reduced, and attitude control of the end effecter (bracket) can be kept stable, making it possible to position the end effecter with high precision. Furthermore, the parallel mechanism according to the present invention has no hook provided at portions for connecting the arms with the biasing members. Accordingly, hook breakage due to fatigue is eliminated, resulting in significantly improved durability.

Figure 1:
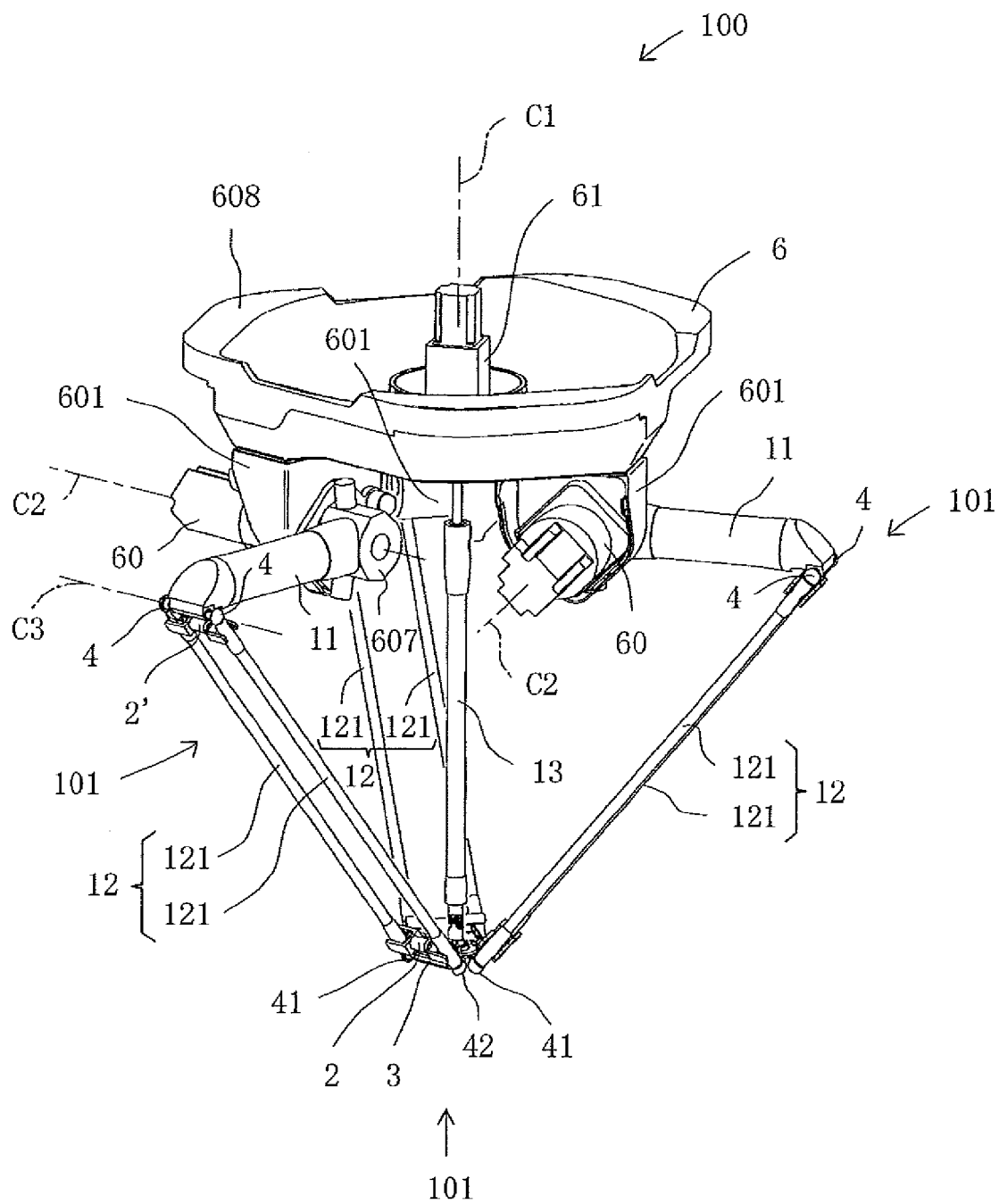
FIG. 1 is a perspective view illustrating a parallel mechanism 100 according to an embodiment.

DESCRIPTION OF THE REFERENCE CHARACTERS 100 parallel mechanism
101 arm unit
11 first arm
12 second arm
121 rod
41, 42 ball joint
2, 2' connecting member
3 bracket
301 attachment piece
302 attachment surface
413 ball
411 first joint element
414 socket
412 second joint element
201 holding member
23 rod cylinder mechanism (telescopic mechanism)
211 first connecting piece
212 second connecting piece
213 coupling piece
10 pin
231 piston rod portion
232 cylinder portion
24 coil spring
21 first plate member
22 second plate member
420 movable socket
421 movable portion
422 coil spring
220 first plate member
221 second plate member
C10 axis
C7 axis
27 coil spring
28 torsion coil spring
C1, C2, C3, C4, C5, C6 axis
C8 straight line

BEST MODE FOR CARRYING OUT THE INVENTION

Hereinafter, embodiments of a parallel mechanism according to the present invention will be described in detail. Note that the embodiments as described below are illustrative examples preferred for carrying out the present invention, and therefore, although various technical limitations are made, the present invention is not limited to these embodiments unless otherwise specified in the following description.

<Overall Configuration of the Parallel Mechanism>

Figure 2:
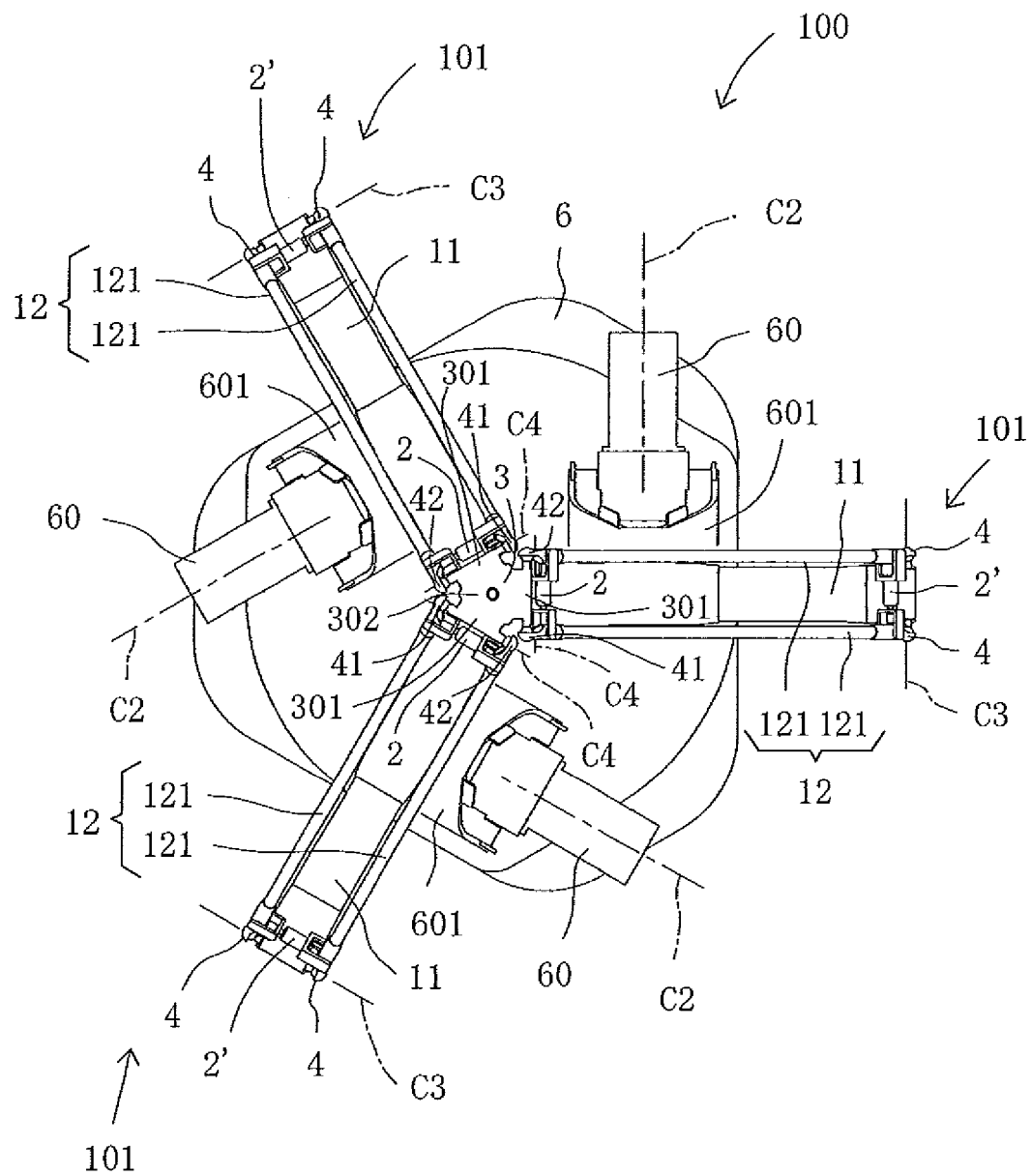
FIG. 2 is a view illustrating the parallel mechanism 100 as seen from arrow 101 in FIG. 1.

FIG. 1 is a perspective view illustrating a parallel mechanism 100 according to an embodiment. FIG. 2 is a view illustrating the parallel mechanism 100 as seen from arrow 101 in FIG. 1. As shown in FIGS. 1 and 2, the parallel mechanism 100 has a base portion 6 provided in its upper portion. The parallel mechanism 100 is supported by fixing the base portion 6 at its attachment surface 608 (the top surface in FIG. 1) to, for example, a horizontal ceiling. The base portion 6 has three support members 601 provided on its lower surface side. Each support member 601 supports its drive motor 60. The drive motor 60 is supported in such an attitude that an axis C2 of a motor shaft is parallel (horizontally) to the attachment surface 608 of the base portion 6. Each support member 601 is positioned an equal angle (120°) apart from one another, centering around a vertical axis C1 of the base portion 6, and thus, each drive motor 60 is also positioned an equal angle (120°) apart from one another, centering around the vertical axis C1 of the base portion 6 (see FIG. 2). A substantially hexagonal column-shaped arm support member 607 concentric with the axis C2 is fixed to an output shaft of each drive motor 60, and the arm support member 607 rotates about the axis C2 via rotation of the output shaft of the drive motor 60. Note that the drive motor 60 has a motor driver connected to an unillustrated control device, which controls the rotation of the output shaft of the drive motor 60.

Figure 3:
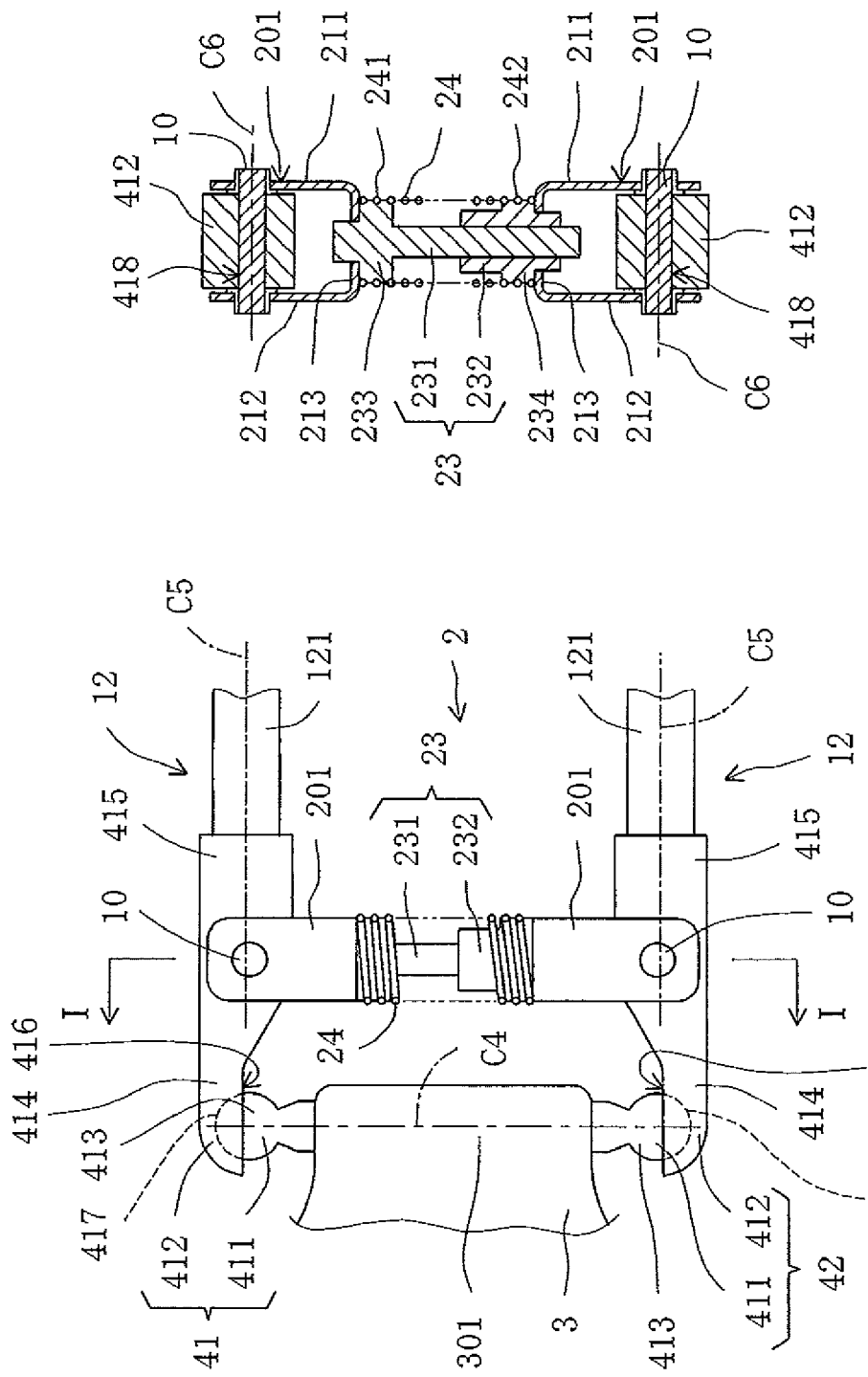
FIG. 3A is an enlarged view of a connecting structure according to a first embodiment.
FIG. 3B is a cross-sectional view taken along line I-I in FIG. 3A.

The parallel mechanism 100 has three arm units 101, each consisting of a first arm 11 and a second arm 12. The first arm 11 has an elongated, substantially columnar shape. The first arm 11 has a base end portion fixed to a side surface of the arm support member 607. The first arm 11 extends from the base end portion such that its longitudinal direction is in parallel to a line that is perpendicular to the axis C2. The first arm 11 has a free end portion connected to the base end portion of the second arm 12 such that the second arm 12 swingably pivots on the free end portion of the first arm 11. The second arm 12 consists of a pair of elongated rods 121, which are positioned in parallel across their entire lengths in their longitudinal directions. The base end portion of each rod 121 is connected to the free end portion of the first arm 11 via a pair of ball joints 4. Note that an axis C3 extending between the ball joints 4 at the base end portions of the rods 121 is parallel to the axis C2 of the drive motor 60, and therefore the second arm 12 also swingably pivots on the axis C3. Also, one rod 121 is connected to the other rod 121 by a connecting member 2' at the base end portion of the second arm 12 and by a connecting member 2 at the free end portion of the second arm 12. The connecting members 2 and 2' may be structured differently, but from the perspective of cost reduction, it is preferable that they have the same structure. The connecting members 2 and 2' both have a function of preventing each rod 121 from rotating about an axis C5 (see FIG. 3) that is parallel to the longitudinal direction of the rod 121.

Also, the parallel mechanism 100 has a plate-like bracket 3 for attaching an end effecter (not shown) as typified by a hand. The bracket 3 has a substantially triangular shape (see FIG. 2). This bracket 3 is retained by three arm units 101 such that an end effecter attachment surface 302 of the bracket 3 (a lower surface of the bracket 3 in FIG. 1) is parallel (horizontally) to the attachment surface 608 of the base portion 6. An attachment piece 301 is formed on each side of the equilateral-triangular bracket 3. Each attachment piece 301 is connected to the free end portion of its arm unit 101 (the free ends of the pair of rods 121 included in the second arm 12), so that the bracket 3 pivots on the free ends of the arm units 101 with respect to the arm units 101. More specifically, each attachment piece 301 of the bracket 3 is connected at its end portion to the free end of its corresponding rod 121 via the ball joints 41 and 42. Note that an axis C4 (see FIG. 2) extending between the pair of ball joints 41 and 42 is also parallel to the axis C2 of the drive motor 60. Therefore, the bracket 3 is capable of swingably pivoting on the horizontal axes C4 with respect to the arm units 101. In addition, the equilateral-triangular bracket 3 is supported by the three arm units 101 such that the bracket 3 can swingably pivot on the horizontal axes C4 at all sides thereof.

The distance between the pair of ball joints 4 at the connection between the first and second arms 11 and 12 is set to be equal to the distance between the pair of ball joints 41 and 42 at the connection between the rods 121 of the second arm 12 and the bracket 3. In this manner, as described above, the pair of rods 121 included in the second arm 12 are positioned in parallel across their entire lengths. The axes C2, C3, and C4 are all parallel to the attachment surface 608 of the base portion 6, and therefore however the first arm 11, the second arm 12, and the bracket 3 pivot on their respective axes C2, C3, and C4, the parallel relationship between the end effecter attachment surface 302 of the bracket 3 and the attachment surface 608 of the base portion 6 is maintained. In addition, in response to an instruction from the unillustrated control device, the motor drivers of the drive motors 60 control the rotational position of the arm support members 607 fixed to the output shafts of the drive motors 60, thereby controlling the position of the free end portion of each first arm 11. The position of the free end portion of the second arm 12 follows the position of the free end portion of the first arm 11 thus controlled, thereby positioning the end effecter attachment surface 302 of the bracket 3. At this time, as described above, the bracket 3 moves while maintaining its horizontal attitude.

Also, the parallel mechanism 100 has provided in its center a swivel axis rod 13 extending in the vertical direction (the top-bottom direction in FIG. 1) and a motor 61 for rotating the swivel axis rod 13. The motor 61 is fixed to the base portion 6 with its output shaft pointing downward in the vertical direction. The swivel axis rod 13 has one end attached to the output shaft of the motor 61 and the other end attached at the median point of the bracket 3. The swivel axis rod 13 may be configured such that an end effecter can be coupled to the aforementioned other end. The swivel axis rod 13 is telescopically realized by a rod and a cylinder. In addition, universal joints are employed at one and the other end of the swivel axis rod 13, and therefore even when the three drive motors 60 drive the bracket 3 to move forward, backward, rightward, or leftward to a given position, the swivel axis rod 13 follows that given position. Note that the motor driver of the motor 61 is connected to an unillustrated control device, which controls the rotation of the output shaft of the motor 61, thereby rotating the end effecter attached to the bracket 3 about the axis C1.

First Embodiment

Referring to FIGS. 3A and 3B, a first embodiment of the structure for connecting the free end portion of the second arm 12 with the attachment piece 301 at one side of the bracket 3 will be described. FIG. 3A is an enlarged view of the connecting structure according to the first embodiment, and FIG. 3B is a cross-sectional view taken along line I-I in FIG. 3A. In this embodiment, the ball joints 41 and 42 employed for connecting the free end portions of the rods 121 with the end portions of the attachment piece 301 of the bracket 3 are configured in the same manner. The ball joints 41 and 42 each include a first joint element 411, which is provided with a spherical ball 413, and a second joint element 412 on which is formed a socket 414 for retaining the ball 413. The first joint element 411 of one of the ball joints 41 is fixed to one side surface of the attachment piece 301 of the bracket 3, whereas the first joint element 411 of the other ball joint 42 is fixed to the other side surface of the attachment piece 301 of the bracket 3.

The second joint element 412 is composed of a rectangular tube portion 415 into which a tip of the rod 121 is inserted, and the socket 414 that has a semicircular column-like shape and concatenated with the rectangular tube portion 415. Provided at the concatenation between the rectangular tube portion 415 and the socket 414 is a hole 418 penetrating diametrically. The socket 414 has a recess 417 caved in hemispherically from its planar surface 416, and the aforementioned ball 413 of the first joint element 411 is loosely fitted in the recess 417. The tip of the rod 121 is inserted into the rectangular tube portion 415 of the second joint element 412 thus configured, thereby fixing the second joint element 412 and the rod 121 so as not to rotate with respect to each other.

The connecting member 2 for connecting the second joint element 412 of one rod 121 with the second joint element 412 of the other rod 121 includes a pair of holding members (first and second connecting members) 201 and a telescopic mechanism 23. The pair of holding members 201 have the same shape, and each holding member 201 externally holds the second joint element 412 (the rectangular tube portion 415) through clipping. The holding member 201 is a substantially rectangular plate being bent approximately at a right angle at two places, and composed of mutually opposing first and second connecting pieces 211 and 212, and a coupling piece 213 for coupling the connecting pieces 211 and 212 at their ends. In addition, each of the first and second connecting pieces 211 and 212 has provided therein a hole penetrating therethrough in its thickness direction. With the holding member 201 clipping the second joint element 412, a pin 10 having the same diameter as the hole in each connecting piece 211, 212, is inserted through each of the hole in the first connecting piece 211, the hole 418 in the second joint element 412, and the hole in the second connecting piece 212, so that the holding member 201 can pivot only about the pin 10 with respect to the second joint element 412. The pin 10 extends in the direction of an axis C6 that is perpendicular to the longitudinal direction C5 of the rod 121. In this manner, the holding member 201 is attached to the rod 121 connected to the second joint element 412 such that the holding member 201 can swingably pivot only about the pin 10 (axis C6). Note that the pins 10 (axes C6) are parallel to each other.

The pair of holding members 201 are joined together by the telescopic mechanism 23. The rod cylinder mechanism (telescopic mechanism) 23 includes a piston rod portion 231 fixed to the coupling piece 213 of one holding member 201, and a cylinder portion 232 fixed to the coupling piece 213 of the other holding member 201. The elongated rod of the piston rod portion 231 is removably inserted into a through hole axially passing through the cylinder portion 232. The piston rod portion 231 includes a seat portion 233 having a larger diameter than the rod, and the cylinder portion 232 includes a seat portion 234 having a larger diameter than the tube portion. A tension coil spring 24 serving as a biasing member is provided to wrap around the circumference of the rod cylinder mechanism 23. The tension coil spring 24 is fixed at one end 241 to the seat portion 233 of the piston rod portion 231 and at the other end 242 to the seat portion 234 of the cylinder portion 232, so that the tension coil spring 24 pulls the piston rod portion 231 and the cylinder portion 232 in a mutually drawing direction. With such a structure having the connecting member 2 and the tension coil spring 24, the free end portion of one rod 121 and the free end portion of the other rod 121 are pulled in a mutually approximating direction.

In this manner, with the balls 413 of the first joint elements 411, which are fixed at the ends of the attachment piece 301 of the bracket 3, being retained in the recesses 417 of the second joint elements 412 at the free end portions of the pair of rods 121, the bracket 3 is held by the second arm 12 such that the bracket 3 can swingably pivot on the axis C4. In addition, when replacing or inspecting the bracket 3 or the second joint element 412, the operator forces the free end portions of the pair of rods 121 away from each other in opposition to the spring force of the tension coil spring 24, thereby releasing the connection between the first and second joint elements 411 and 412, and thus the bracket 3 can be detached from the second arm 12.

With the above structure for connecting the free end portion of the second arm 12 with the attachment piece 301 on one side of the bracket 3, the biasing force of the tension coil spring 24 serving as a biasing member is limitedly effected in only the axial direction of the piston rod portion 231 of the telescopic mechanism 23, so that the free end portion of the rod 121 and the holding member 201 of the connecting member 2 can swingably pivot only about the pin 10 (axis C6). Accordingly, even when the drive motors 60 (see FIG. 1) are driven to operate the arm units 101 and thereby move the bracket 3 to a given spatial position, each rod 121 does not rotate on the axis C5. Therefore, deterioration of the ball joints 41 and 42, which are made of synthetic resin, due to abrasion of the ball 413 and the socket 414 is retarded, and the attitude control of the end effecter (bracket 3) is stabilized. As a result, the end effecter is positioned with high precision. Also, hook breakage due to fatigue does not occur because the tension coil spring 24 serving as a biasing member has no hook.

Note that the aforementioned connecting structure of the first embodiment is also employed for the connection between the free end portion of the first arm 11 and the base end portion of the second arm 12, i.e., the connection between the free end portion of the first arm 11 and the base end portions of the pair of rods 121. In addition, the connecting structure is also employed for the connection between the free end portion of the first arm 11 and the base end portion of the second arm 12, so that the rotation of each rod 121 about the axis C5 is limited during operation of the arm unit 101, minimizing deterioration of the ball joints 4. As a result, the attitude control of the end effecter (bracket 3) is stabilized.

Second Embodiment

Figure 4:
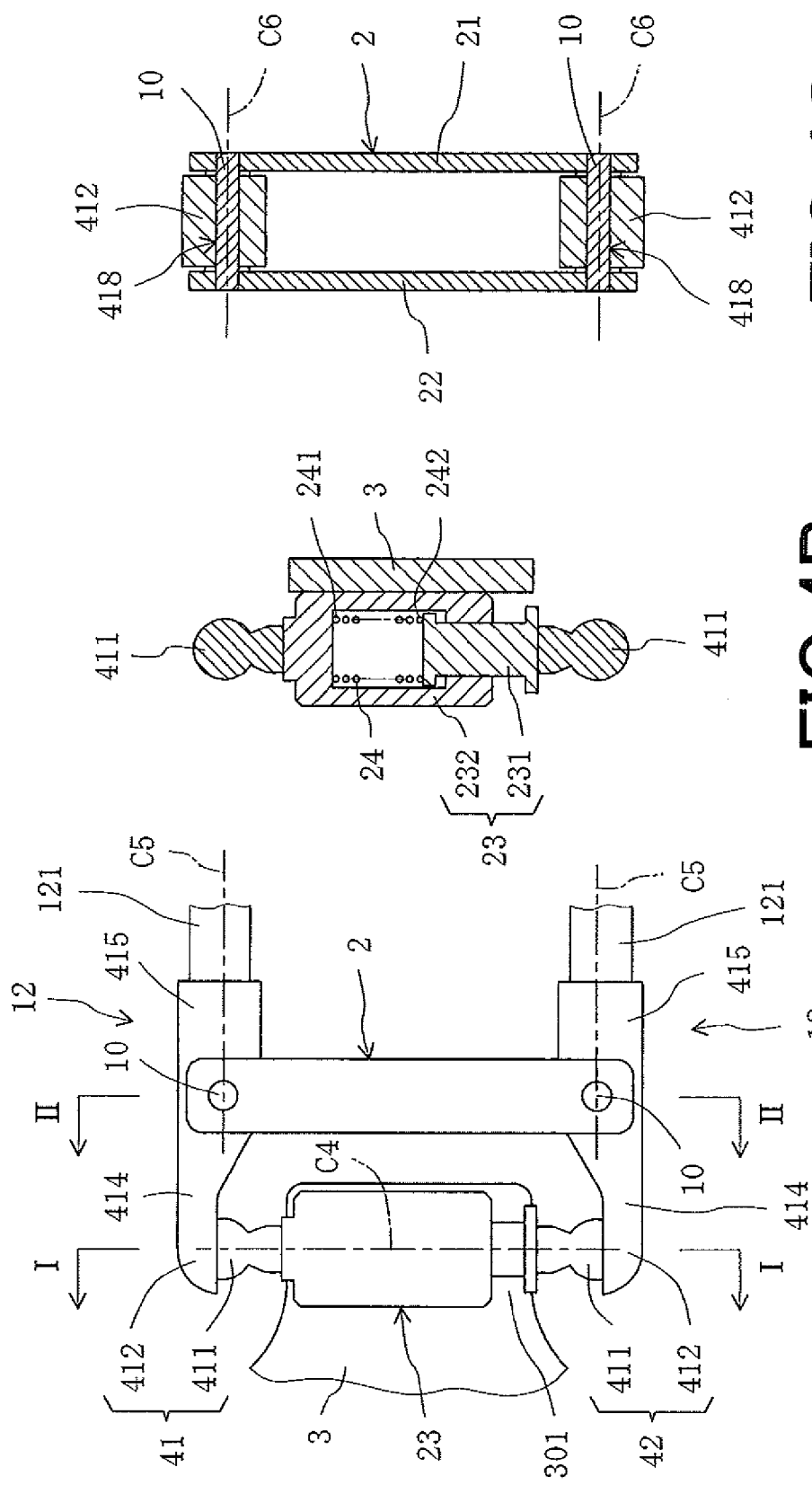
FIG. 4A is an enlarged view of a connecting structure according to a second embodiment.
FIG. 4B is a cross-sectional view taken along line I-I in FIG. 4A.
FIG. 4C is a cross-sectional view taken along line II-II in FIG. 4A.

Referring to FIGS. 4A, 4B, and 4C, a second embodiment of the structure for connecting the free end portion of the second arm 12 with the attachment piece 301 on one side of the bracket 3 will be described. FIG. 4A is an enlarged view of the connecting structure according to the second embodiment, FIG. 4B is a cross-sectional view taken along line I-I in FIG. 4A, and FIG. 4C is a cross-sectional view taken along line II-II in FIG. 4A. Note that only differences from the first embodiment will be described in detail. As in the first embodiment, the free end portions of the rods 121 are connected to the end of the attachment piece 301 of the bracket 3 by the ball joints 41 and 42. The ball joints 41 and 42 each include a first joint element 411 and a second joint element 412. The second joint element 412 includes a rectangular tube portion 415 and a socket 414. Provided at the concatenation between the rectangular tube portion 415 and the socket 414 is a hole 418 penetrating diametrically.

In this embodiment, the connecting member 2 for connecting the second joint element 412 of one rod 121 with the second joint element 412 of the other rod 121 includes a pair of elongated plate members 21 and 22. The pair of plate members 21 and 22 have the same shape, and externally hold the second joint elements 412 (the rectangular tube portions 415) through clipping. Provided at both ends of each plate member 21, 22 is a hole penetrating therethrough in its thickness direction. With the plate members 21 and 22 clipping the second joint elements 412, a pin 10 having approximately the same diameter as the hole in each plate member 21, 22 is inserted through the hole in the first plate member 21, the hole 418 in the second joint element 412, and the hole in the second plate member 22, so that the plate member 21, 22 can swingably pivot only about the pin 10 with respect to the second joint element 412. The pin 10 extends in the direction of the axis C6 that is perpendicular to the longitudinal direction C5 of the rod 121. In this manner, each plate member 21, 22 is attached to the rod 121 such that the plate members 21, 22 can swingably pivot only about the pin 10 (axis C6).

The telescopic mechanism 23 is fixed to the attachment piece 301 of the bracket 3. The rod cylinder mechanism (telescopic mechanism) 23 includes a piston rod portion 231 and a cylinder portion 232. The cylinder portion 232 is fixed to the attachment piece 301 of the bracket 3. The cylinder portion 232 is closed at one end to which one first joint element 411 is fixed. Through the other end of the cylinder portion 232, the piston rod portion 231 is removably inserted in the direction of the axis C4. The piston rod portion 231 has the other first joint element 411 fixed at one end (outside the cylinder portion 232). In addition, the cylinder portion 232 has contained in its cylinder chamber a compression coil spring 24 serving as a biasing member. The compression coil spring 24 is fixed at one end 241 within the cylinder chamber of the cylinder portion 232 and at the other end 242 to the other end (inside the cylinder portion 232) of the piston rod portion 231. When the compression coil spring 24 expands, the first joint elements 411 are biased away from each other, so that the first joint elements 411 are held by the second joint elements 412 at the ball joints 41 and 42.

In this manner, with the first joint elements 411 fixed to the attachment piece 301 of the bracket 3 being retained by the second joint elements 412 at the free end portions of the pair of rods 121, the bracket 3 is retained by the second arm 12 such that the bracket 3 can swingably pivot on the axis C4. In addition, when replacing or inspecting the bracket 3 or the second joint element 412, the operator forces the first joint elements 411 away from each other in opposition to the spring force of the compression coil spring 24, thereby releasing the connections between the first joint elements 411 and the second joint elements 412, so that the bracket 3 can be detached from the second arm 12.

With the above structure for connecting the free end portion of the second arm 12 with the attachment piece 301 on one end of the bracket 3, the free end portion of the rod 121 and the plate member 21, 22, of the connecting member can swingably pivot only about the pin 10 (axis C6). Thus, even when the bracket 3 is moved to a given spatial position, each rod 121 does not rotate on the axis C5.

Third Embodiment

Figure 5:
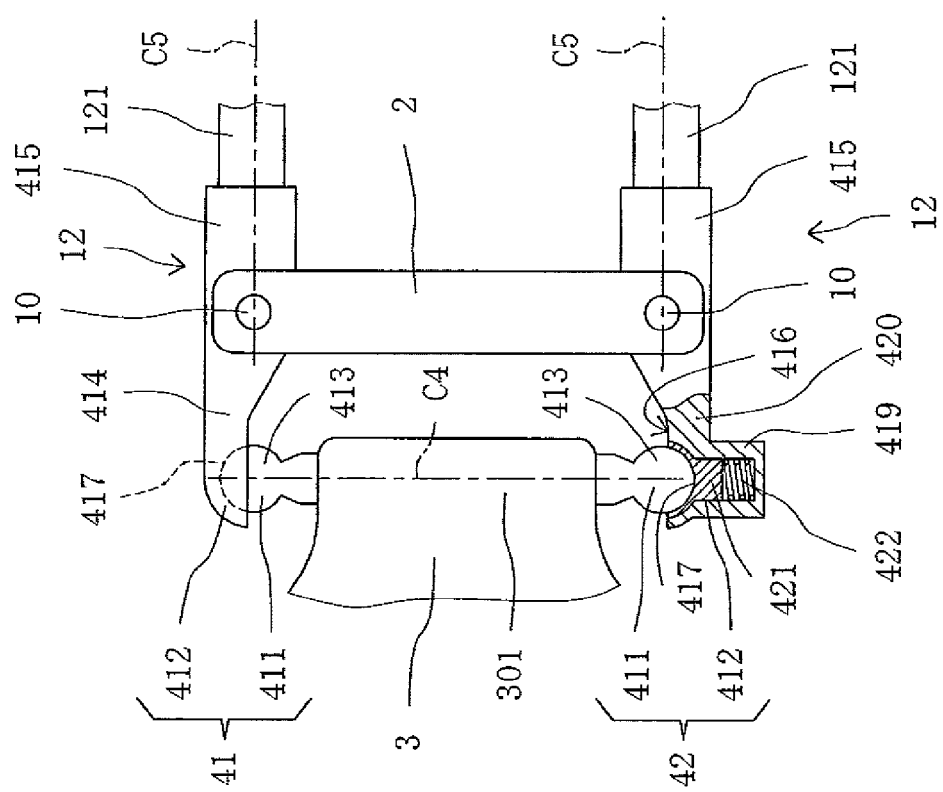
FIG. 5 is an enlarged view of a connecting structure according to a third embodiment.

Referring to FIG. 5, a third embodiment of the structure for connecting the free end portion of the second arm 12 with the attachment piece 301 on one side of the bracket 3 will be described. FIG. 5 is a partial cutaway view illustrating in enlargement the connecting structure according to the third embodiment. Note that only differences from the above embodiments will be described in detail. The connecting member 2 for connecting the second joint element 412 of one rod 121 with the second joint element 412 of the other rod 121 has the same configuration as in the second embodiment. Accordingly, even when the bracket 3 is moved to a given spatial position, each rod 121 does not rotate on the axis C5. Also, as in the first embodiment, the first joint elements 411 of the ball joints 41 and 42 are fixed to opposite ends of the attachment piece 301 of the bracket 3. In addition, as in the first embodiment, the second joint element 412 of one ball joint 41 includes a rectangular tube portion 415 and a socket 414 in which a recess 417 is provided. A ball 413 of the first joint element 411 is fitted in the recess 417.

In this embodiment, the second joint element 412 of the other ball joint 42 is composed of a rectangular tube portion 415 and a movable socket 420. The movable socket 420 includes a movable portion 421 with a recess 417 in which the ball 413 of the first joint element 411 is fitted. Also, the movable socket 420 has a housing portion 419 protruding away from a planar surface 416, and the housing portion 419 has contained therein a compression coil spring 422 serving as a biasing member. Also, the housing portion 419 has the movable portion 421 contained therein. Thus, the biasing force of the compression coil spring 422 is effected in the direction of the axis C4, so that the movable portion 421 is biased in such a direction that its recess 417 approximates and is pressed upon the ball 413. Note that the movable socket 420 may be provided to both the second joint elements 412 of the ball joints 41 and 42.

In this manner, with the balls 413 of the first joint elements 411, which are fixed at the end portions of the attachment piece 301 of the bracket 3, being retained in the recesses 417 of the second joint elements 412 at the free end portions of the pair of rods 121, the bracket 3 is retained by the second arm 12 such that the bracket 3 can swingably pivot on the axis C4. In addition, when replacing or inspecting the bracket 3 or the second joint element 412, the operator forces the movable portion 421 of the movable socket 420 of the second joint element 412 away from the ball 413 of the first joint element 411 in opposition to the spring force of the compression coil spring 422, thereby releasing the connection between the first and second joint elements 411 and 412, so that the bracket 3 can be detached from the second arm 12.

With the above structure for connecting the free end portion of the second arm 12 with the attachment piece 301 on one side of the bracket 3, the free end portion of the rod 121 and the plate members 21, 22 of the connecting member 2 can swingably pivot only about the pin 10 (axis C6). Thus, even when the bracket 3 is moved to a given spatial position, each rod 121 does not rotate about the axis C5.

Fourth Embodiment

Figure 6:
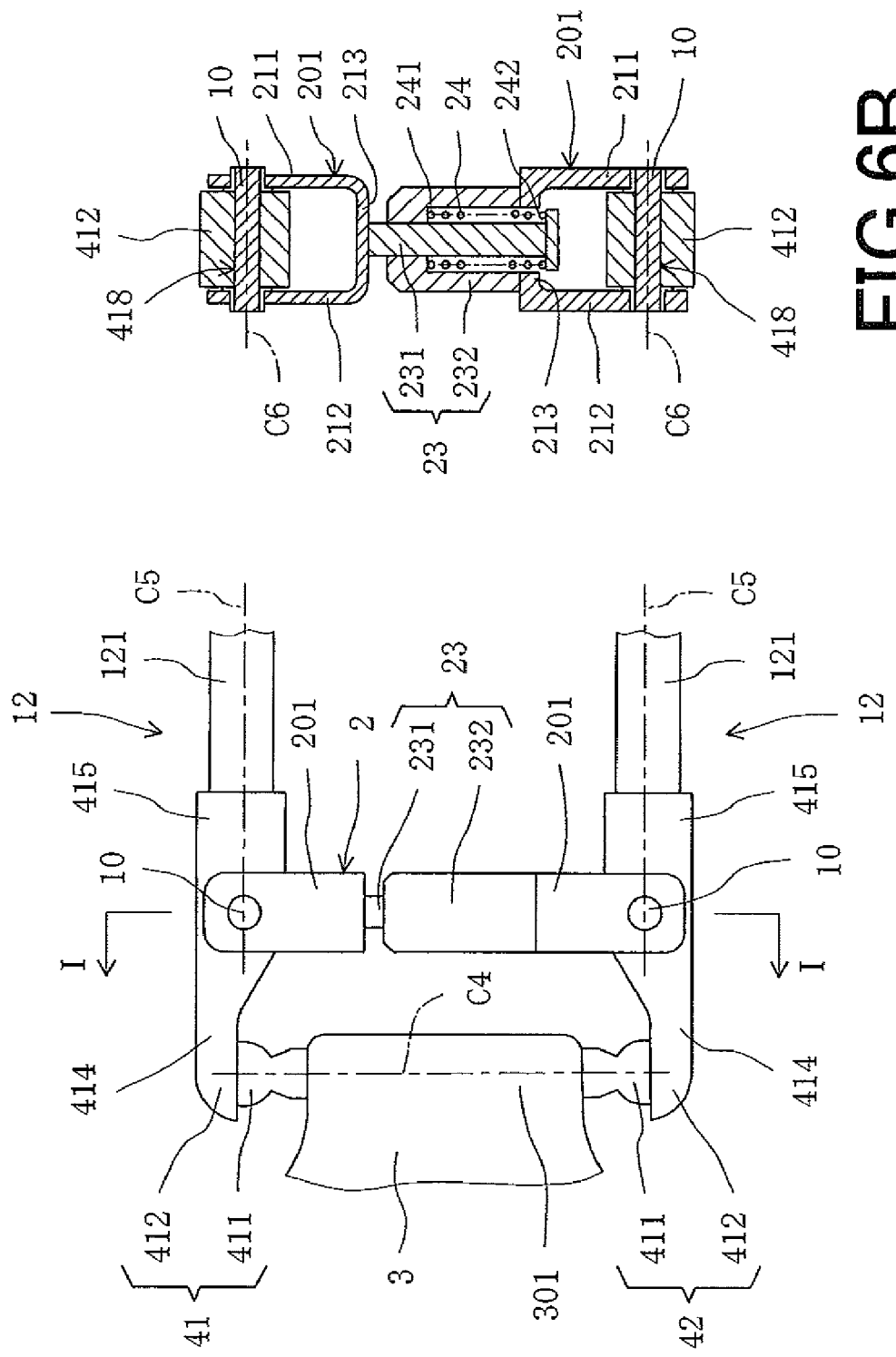
FIG. 6A is an enlarged view of a connecting structure according to a fourth embodiment.
FIG. 6B is a cross-sectional view taken along line I-I in FIG. 6A.

Referring to FIGS. 6A and 6B, a fourth embodiment of the structure for connecting the free end portion of the second arm 12 with the attachment piece 301 on one side of the bracket 3 will be described. FIG. 6A is an enlarged view of the connecting structure according to the fourth embodiment, and FIG. 6B is a cross-sectional view taken along line I-I in FIG. 6A. Note that only differences from the above embodiments will be described in detail. In this embodiment, the ball joints 41 and 42 employed for connecting the free end portions of the rods 121 with the end portions of the attachment piece 301 of the bracket 3 are configured in the same manner as in the first embodiment. The ball joints 41 and 42 each include a first joint element 411 and a second joint element 412. The second joint element 412 is composed of a rectangular tube portion 415 and a socket 414.

In this embodiment, the connecting member 2 for connecting the second joint element 412 of one rod 121 with the second joint element 412 of the other rod 121 includes a pair of holding members (first and second connecting members) 201, and a telescopic mechanism 23. The pair of holding members 201 externally hold the second joint elements 412 through clipping. As in the first embodiment, the holding member 201 is composed of mutually opposing first and second connecting pieces 211 and 212, and a coupling piece 213 for coupling the connecting pieces 211 and 212 at their ends. In addition, each of the first and second connecting pieces 211 and 212 has provided therein a hole penetrating therethrough in its thickness direction. With the holding member 201 clipping the second joint element 412, a pin 10 having the same diameter as the hole in each connecting piece 211, 212 is inserted into the hole in the first connecting piece 211, the hole 418 in the second joint element 412, and the hole in the second connecting piece 212, so that the holding member 201 can swingably pivot only about the pin 10 with respect to the second joint element 412. In this manner, the holding member 201 is attached to the rod 121 such that the holding member 201 can swingably pivot only about the pin 10 (the axis C6 that is perpendicular to the longitudinal direction C5 of the rod 121).

The pair of holding members 201 are joined together by the telescopic mechanism 23. The rod cylinder mechanism (telescopic mechanism) 23 includes a piston rod portion 231 fixed to the coupling piece 213 of one holding member 201, and a cylinder portion 232 fixed to the coupling piece 213 of the other holding member 201. The coupling piece 213 at which the aforementioned other holding member 201 is provided, and the cylinder portion 232 each have provided therein a through hole axially passing therethrough, and the piston rod portion 231 is removably inserted into the through hole. A compression coil spring 24 serving as a biasing member is provided within a cylinder chamber of the cylinder portion 232 so as to wrap around the circumference of the piston rod portion 231. The compression coil spring 24 is fixed at one end 241 within the cylinder chamber of the cylinder portion 232 and fixed at the other end 242 to a brim portion having a slightly larger diameter provided at the other end of the piston rod portion 231. When the compression coil spring 24 expands, the piston rod portion 231 and the cylinder portion 232 are pulled in a mutually drawing direction. With such a structure having the connecting member 2 and the compression coil spring 24, the free end portion of one rod 121 and the free end portion of the other rod 121 are pulled in a mutually approximating direction.

In this manner, the bracket 3 is held by the second arm 12 such that the bracket 3 can swingably pivot on the axis C4. In addition, when replacing or inspecting the bracket 3 or the second joint element 412, the operator forces the free end portions of the pair of rods 121 away from each other in opposition to the spring force of the compression coil spring 24, thereby releasing the connection between the first and second joint elements 411 and 412, so that the bracket 3 can be detached from the second arm 12.

With the above structure for connecting the free end portion of the second arm 12 with the attachment piece 301 on one side of the bracket 3, the biasing force of the compression coil spring 24 serving as a biasing member is limitedly effected in only the axial direction of the piston rod portion 231 of the telescopic mechanism 23, so that the free end portion of the rod 121 and the holding member 201 of the connecting member 2 can swingably pivot only about the pin 10 (axis C6). Thus, even when the drive motors 60 (see FIG. 1) are driven to operate the arm units 101 and thereby move the bracket 3 to a given spatial position, each rod 121 does not rotate about the axis C5.

Fifth Embodiment

Figure 7:
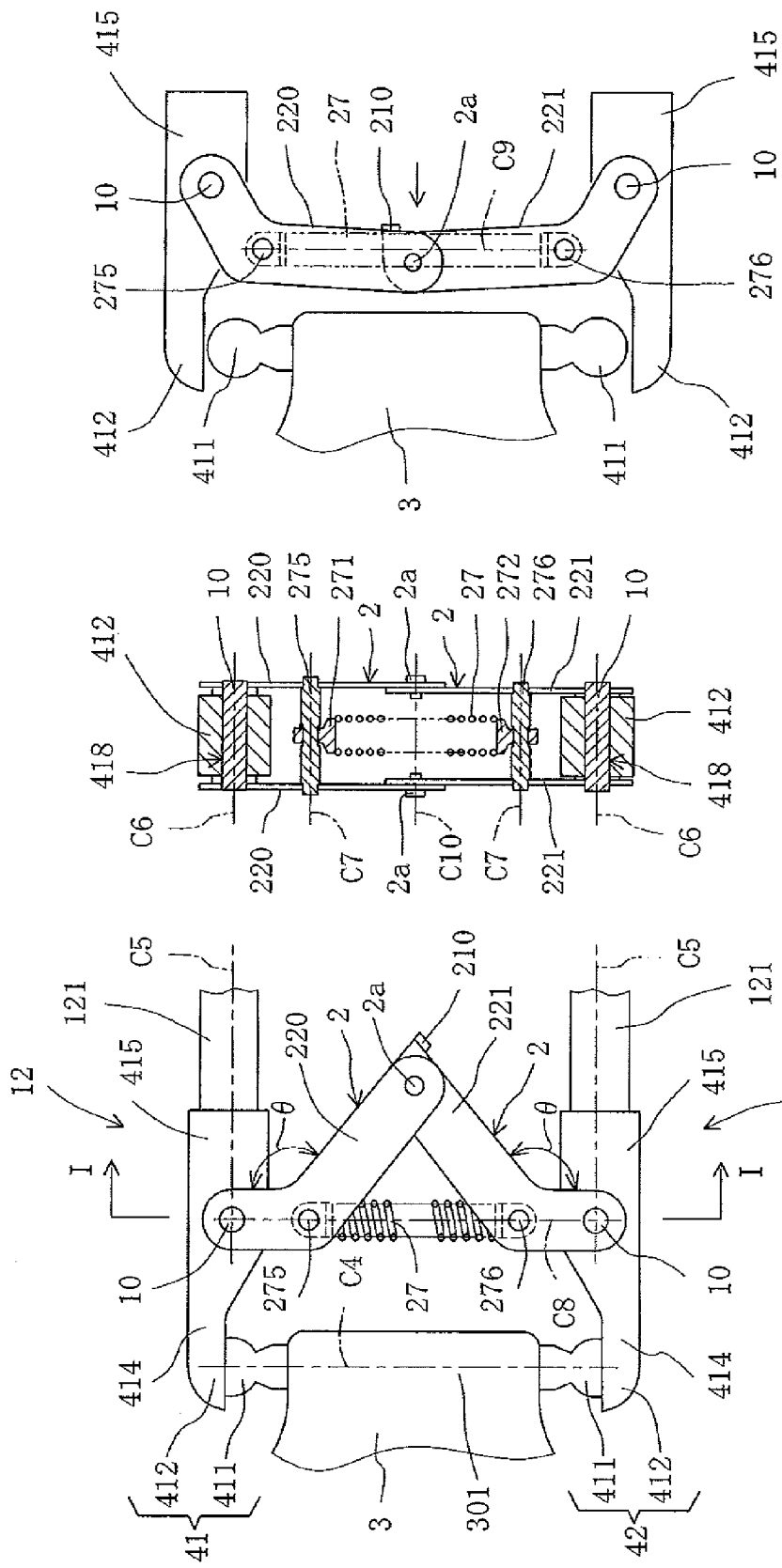
FIG. 7A is an enlarged view of a connecting structure according to a fifth embodiment.
FIG. 7B is a cross-sectional view taken along line I-I in FIG. 7A.
FIG. 7C is a view in which ball joints are detached.

Referring to FIGS. 7A, 7B, and 7C, a fifth embodiment of the structure for connecting the free end portion of the second arm 12 with the attachment piece 301 on one side of the bracket 3 will be described. FIG. 7A is an enlarged view of the connecting structure according to the fifth embodiment, FIG.

7B is a cross-sectional view taken along line I-I in FIG. 7A, and FIG. 7C is a view in which ball joints are detached. Note that only differences from the above embodiments will be described in detail. In this embodiment, the ball joints 41 and 42 employed for connecting the free end portions of the rods 121 with the end portions of the attachment piece 301 of the bracket 3 have the same configuration as in the first embodiment. The ball joints 41 and 42 each include a first joint element 411 and a second joint element 412. The second joint element 412 is composed of a rectangular tube portion 415 and a socket 414.

In this embodiment, the second joint element 412 of one rod 121 and the second joint element 412 of the other rod 121 are connected together by a pair of connecting members 2. The first connecting member 2, one of the pair of connecting members 2, includes a pair of first plate members 220. The second connecting member 2, the other of the pair of connecting members 2, includes a pair of second plate members 221. The first and second plate members 220 and 221 each externally hold the second joint element 412 (the rectangular tube portion 415) through clipping. The first and second plate members 220 and 221 are each an elongated plate member bent at angle θ (e.g., 130°). In addition, the first and second plate members 220 and 221 each have provided at one end a hole penetrating therethrough in its thickness direction. With the first plate members 220 clipping the second joint element 412, a pin 10 having the same diameter as the hole in each first plate member 220 is inserted into the hole in one first plate member 220, the hole 418 in the second joint element 412, and the hole in the other first plate member 220, so that each first plate member 220 can swingably pivot only about the pin 10 (the axis C6 that is perpendicular to the length C5 of the rod 121) with respect to the second joint element 412. Also, with the second plate members 221 clipping the second joint element 412, a pin 10 having the same diameter as the hole in each second plate member 221 is inserted into the hole in one second plate member 221, the hole 418 in the second joint element 412, and the hole in the other second plate member 221, so that each second plate member 221 can swingably pivot only about the pin 10 (axis C6) with respect to the second joint element 412. Moreover, the first and second plate members 220 and 221 are rotatably connected together at the other end by a connecting shaft 2a. The connecting shaft 2a has as its center an axis C10 that is perpendicular to the longitudinal direction C5 of the rod 121, and therefore the first and second plate members 220 and 221 can swingably pivot only about the connecting shaft 2a (axis C10) relative to each other. In this manner, the connecting members 2 are each attached to the rod 121 such that the connecting members 2 can swingably pivot only about the pin 10 (axis C6) and the connecting shaft 2a (axis C10).

The pair of mutually opposing first plate members 220 are pivotably connected together at their bending points by a support shaft 275. Also, the pair of mutually opposing second plate members 221 are pivotably connected together at their bending points by a support shaft 276. The support shafts 275 and 276 each have as its center an axis C7 that is parallel to the axis C6. In this manner, the connecting members 2 are each attached to the rod 121 such that the connecting members 2 can swingably pivot only about the support shafts 275, 276 (axis C7).

The pair of connecting members 2 are further connected by a tension coil spring 27 serving as a biasing member. The tension coil spring 27 is pivotably attached at one end 271 to the support shaft 275 and at the other end 272 to the support shaft 276. In this manner, the tension coil spring 27 is attached such that the spring 27 can pivot only about the support shafts 275 and 276 (axes C7). Moreover, when the tension coil spring 27 is compressed, the support shafts 275 and 276 are pulled in a mutually drawing direction. In addition, the biasing force of the tension coil spring 27 is limitedly effected in only one direction. Accordingly, each first plate member 220 (first connecting member 2) and each second plate member 221 (second connecting member 2) swingably pivot on the pin 10, the connecting shaft 2a, and the support shafts 275, 276. In addition, each pin 10 (axis C6) and each support shaft 275, 276, (axis C7) are aligned on a straight line C8, and the free end portion of one rod 121 and the free end portion of the other rod 121 are pulled in a mutually approximating direction. Note that in this state, the connecting shaft 2a is placed away from the straight line C8.

In this manner, the bracket 3 is held by the second arm 12 such that the bracket 3 can swingably pivot on the axis C4. The second plate member 221 is provided with a stopper 210 in the vicinity of the connecting shaft 2a. When replacing or inspecting the bracket 3 or the second joint element 412, the operator moves the connecting shaft 2a toward the compression coil spring 27 in opposition to the spring force of the compression coil spring 27 (see FIG. 7C). Then, when the connecting shaft 2a passes a line C9 extending between the support shafts 275 and 276, the stopper 210 is brought into contact or is engaged with the first plate member 220, thereby retaining the positions of the first and second plate members 220 and 221. As a result, the compression coil spring 27 expands to push the free end portions of the pair of rods 121 away from each other, thereby releasing the connection between the first and second joint elements 411 and 412, so that the bracket 3 can be detached from the second arm 12.

With the above structure for connecting the free end portion of the second arm 12 with the attachment piece 301 on one side of the bracket 3, the direction in which the biasing force of the compression coil spring 27 serving as a biasing member is effected is limited, and thus the free end portions of the rods 121 and the connecting members 2 can swingably pivot only about the pin 10 (axis C6), the connecting shaft 2a (axis C10), and the support shafts 275, 276 (axis C7). Thus, even when the drive motors 60 (see FIG. 1) are driven to operate the arm units 101 and thereby move the bracket 3 to a given spatial position, each rod 121 does not rotate about the axis C5.

Sixth Embodiment

Figure 8:
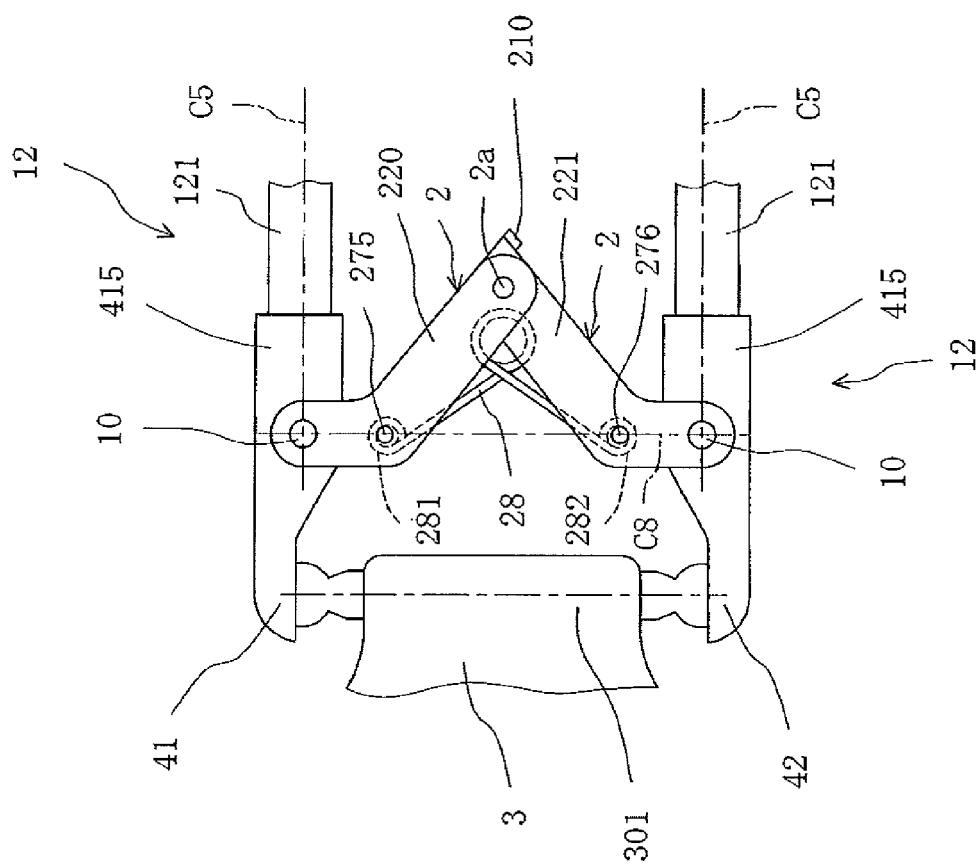
FIG. 8 is an enlarged view of a connecting structure according to a sixth embodiment.

Referring to FIG. 8, a sixth embodiment of the structure for connecting the free end portion of the second arm 12 with the attachment piece 301 on one side of the bracket 3 will be described. FIG. 8 is an enlarged view of the connecting structure according to the sixth embodiment. Note that only differences from the fifth embodiment will be described in detail. In this embodiment, a torsion coil spring 28 is provided instead of the compression coil spring 27 of the fifth embodiment. The torsion coil spring 28 is pivotably attached at one end 281 to the support shaft 275 and at the other end 282 to the support shaft 276. Other features are the same as in the fifth embodiment. Accordingly, the connecting member 2 is attached to the rod 121 such that the connecting member 2 can swingably pivot only about the pin 10 (axis C6), the connecting shaft 2a (axis C10), and the support shafts 275, 276 (axis C7). In addition, the spring force of the torsion coil spring 28 causes the two ends 281 and 282 to draw each other, so that each pin 10 (axis C6) and each support shaft 275, 276, (axis C7) are aligned on the straight line C8, pulling the free end portion of one rod 121 and the free end portion of the other rod 121 in a mutually approximating direction. In addition, the biasing force of the torsion coil spring 28 is limitedly effected only in one direction. Thus, even when the drive motors 60 (see FIG. 1) are driven to operate the arm units 101 and thereby move the bracket 3 to a given spatial position, each rod 121 does not rotate about the axis C5.

<Variants>

In any of the above embodiments, the connecting member 2 retains the second joint element 412 (the rectangular tube portion 415) through clipping, but it may directly retain the rod 121 through clipping, thereby limiting rotation of the rod 121 about the axis C5. Also, for example, in the second embodiment, the effect does not change even if the second plate member 22 is replaced with an anti-fall-off member for the pin 10 (i.e., the second plate member 22 does not connect the second joint elements 412 together, and only the first plate member 21 connects the second joint elements 412 together).

The invention claimed is:

1. A parallel mechanism comprising:
   arms each being swingably pivotable on a base end portion and each including a pair of rods aligned in parallel in a longitudinal direction thereof;
   a bracket having an end effecter attached thereto, the bracket being retained between the pair of rods at a free end portion of the arms;
   a pair of ball joints for displaceably connecting the bracket with the arms, the ball joints each including
      a first joint element having a ball and provided to one of the pair of rods and the bracket, and
      a second joint element having a socket for retaining the ball and provided to the other of the pair of rods and the bracket;
   a connecting member for connecting the parallel rods, and for completely restricting rotation of each rod about an axis that is parallel to the longitudinal direction of the rod; and
   a biasing member for providing a biasing force for retaining the balls in the sockets at the ball joints.

2. The parallel mechanism according to claim 1, wherein the biasing force of the biasing member is limitedly effected only in one direction.

3. A parallel mechanism comprising:
   arms each being swingably pivotable on a base end portion and each including a pair of rods aligned in parallel in a longitudinal direction thereof;
   a bracket having an end effecter attached thereto, the bracket being retained between the pair of rods at a free end portion of the arms;
   a pair of ball joints for displaceably connecting the bracket with the arms, the ball joints each including
      a first joint element having a ball and provided to one of the pair of rods and the bracket, and
      a second joint element having a socket for retaining the ball and provided to the other of the pair of rods and the bracket;
   a connecting member for connecting the parallel rods, and for restricting rotation of each rod about an axis that is parallel to the longitudinal direction of the rod; and
   a biasing member for providing a biasing force for retaining the balls in the sockets at the ball joints,
   wherein the connecting member includes:
   a first connecting member attached to one of the pair of rods such that the first connecting member is swingably pivotable on a first axis that is perpendicular to the longitudinal direction of the rod;
   a second connecting member attached to the other of the pair of rods such that the second connecting member is swingably pivotable on a second axis that is parallel to the first axis;
   a piston rod portion fixed to the first connecting member; and
   a cylinder portion fixed to the second connecting member, the cylinder portion having the piston rod portion inserted there into movably in the axial direction of the piston rod portion, and
   wherein the biasing member is a coil spring provided to wrap around the circumference of the piston rod port ion, the coil spring being compressed to pull the pair of rods closer to each other, thereby retaining the ball in the socket at each of the ball joints.

4. A parallel mechanism comprising:
   arms each being swingably pivotable on a base end portion and each including a pair of rods aligned in parallel in a longitudinal direction thereof;
   a bracket having an end effecter attached thereto, the bracket being retained between the pair of rods at a free end portion of the arms;
   a pair of ball joints for displaceably connecting the bracket with the arms, the ball joints each including
      a first joint element having a ball and provided to one of the pair of rods and the bracket, and
      a second joint element having a socket for retaining the ball and provided to the other of the pair of rods and the bracket;
   a connecting member for connecting the parallel rods, and for restricting rotation of each rod about an axis that is parallel to the longitudinal direction of the rod; and
   a biasing member for providing a biasing force for retaining the balls in the sockets at the ball joints,
   wherein the connecting member includes:
   a portion attached to one of the pair of rods such that the portion is swingably pivotable on the first axis that is perpendicular to the longitudinal direction of the rod; and
   a portion attached to the other of the pair of rods such that the portion is swingably pivotable on the second axis that is parallel to the first axis,
   wherein provided at the ball joints are:
   the second joint elements each being fixed to each rod; and
   the first joint elements each including a cylinder portion fixed to the bracket, and a piston rod portion inserted into the cylinder portion movably in an axial direction thereof, and
   wherein the biasing member is a coil spring contained in a cylinder chamber of the cylinder portion, the coil spring expanding to bias the first joint elements away from each other, thereby retaining the ball in the socket at each of the ball joints.

5. A parallel mechanism comprising:
   arms each being swingably pivotable on a base end portion and each including a pair of rods aligned in parallel in a longitudinal direction thereof;
   a bracket having an end effecter attached thereto, the bracket being retained between the pair of rods at a free end portion of the arms;
   a pair of ball joints for displaceably connecting the bracket with the arms, the ball joints each including
      a first joint element having a ball and provided to one of the pair of rods and the bracket, and
      a second joint element having a socket for retaining the ball and provided to the other of the pair of rods and the bracket;

a connecting member for connecting the parallel rods, and for restricting rotation of each rod about an axis that is parallel to the longitudinal direction of the rod; and
a biasing member for providing a biasing force for retaining the balls in the sockets at the ball joints,
wherein the connecting member includes:
a portion attached to one of the pair of rods such that the portion is swingably pivotable on the first axis that is perpendicular to the longitudinal direction of the rod; and
a portion attached to the other of the pair of rods such that the portion is swingably pivotable on the second axis that is parallel to the first axis,
wherein the first and second joint elements are provided at the ball joints, the first joint element being fixed to the bracket, the second joint element being fixed to the rod, and
wherein at least one of the second joint elements fixed to the pair of rods is provided with the socket in a movable manner such that the socket is biased by the coil spring serving as a biasing member, the coil spring expanding to push the movable socket upon the ball, thereby retaining the ball in the socket at each of the ball joints.

6. A parallel mechanism comprising:
arms each being swingably pivotable on a base end portion and each including a pair of rods aligned in parallel in a longitudinal direction thereof;
a bracket having an end effecter attached thereto, the bracket being retained between the pair of rods at a free end portion of the arms;
a pair of ball joints for displaceably connecting the bracket with the arms, the ball joints each including
a first joint element having a ball and provided to one of the pair of rods and the bracket, and
a second joint element having a socket for retaining the ball and provided to the other of the pair of rods and the bracket;
a connecting member for connecting the parallel rods, and for restricting rotation of each rod about an axis that is parallel to the longitudinal direction of the rod; and
a biasing member for providing a biasing force for retaining the balls in the sockets at the ball joints,
wherein the connecting member includes:
a first connecting member attached to one of the pair of rods such that the first connecting member is swingably pivotable on the first axis that is perpendicular to the longitudinal direction of the rod;
a second connecting member attached to the other of the pair of rods such that the second connecting member is swingably pivotable on the second axis that is parallel to the first axis;
a piston rod portion fixed to the first connecting member; and
a cylinder portion fixed to the second connecting member, the cylinder portion having the piston rod portion inserted thereinto movably in an axial direction thereof, and
wherein the biasing member is a coil spring provided to wrap around the circumference of the piston rod portion, the coil spring expanding to pull the pair of rods closer to each other, thereby retaining the ball in the socket at each of the ball joints.

7. A parallel mechanism comprising:
arms each being swingably pivotable on a base end portion and each including a pair of rods aligned in parallel in a longitudinal direction thereof;
a bracket having an end effecter attached thereto, the bracket being retained between the pair of rods at a free end portion of the arms;
a pair of ball joints for displaceably connecting the bracket with the arms, the ball joints each including
a first joint element having a ball and provided to one of the pair of rods and the bracket, and
a second joint element having a socket for retaining the ball and provided to the other of the pair of rods and the bracket;
a connecting member for connecting the parallel rods, and for restricting rotation of each rod about an axis that is parallel to the longitudinal direction of the rod; and
a biasing member for providing a biasing force for retaining the balls in the sockets at the ball joints,
wherein the connecting member includes a pair of connecting members supported such that the pair of connecting members is swingably pivotable relative to each other in a direction that is perpendicular to the longitudinal direction of the pair of rods;
wherein a first one of the pair of connecting members is attached to one of the pair of rods such that the first connecting member is swingably pivotable on the first axis that is parallel to a direction that is perpendicular to the longitudinal direction of the rod,
wherein a second one of the pair of connecting members is attached to the other of the pair of rods such that the second connecting member is swingably pivotable on the second axis that is parallel to the first axis,
wherein the biasing member is a coil spring having one end attached to the first connecting member such that the spring can swing around a third axis that is parallel to the first axis and the other end attached to the second connecting member such that the spring can swing around a fourth axis that is parallel to the second axis, and
wherein the coil spring is compressed to place all of the first, second, third, and fourth axes on a straight line, and thereby pulls the pair of rods closer to each other, so that the ball is retained in the socket at each of the ball joints.

8. A parallel mechanism comprising:
arms each being swingably pivotable on a base end portion and each including a pair of rods aligned in parallel in a longitudinal direction thereof;
a bracket having an end effecter attached thereto, the bracket being retained between the pair of rods at a free end portion of the arms;
a pair of ball joints for displaceably connecting the bracket with the arms, the ball joints each including
a first joint element having a ball and provided to one of the pair of rods and the bracket, and
a second joint element having a socket for retaining the ball and provided to the other of the pair of rods and the bracket;
a connecting member for connecting the parallel rods, and for restricting rotation of each rod about an axis that is parallel to the longitudinal direction of the rod; and
a biasing member for providing a biasing force for retaining the balls in the sockets at the ball joints,
wherein the connecting member includes a pair of connecting members supported such that the connecting members be swingably pivotable relative to each other in a direction that is perpendicular to the longitudinal direction of the pair of rods,
wherein a first one of the pair of connecting members is attached to one of the pair of rods such that the first connecting member is swingably pivotable on the first axis that is parallel to a direction that is perpendicular to the longitudinal direction of the rod, wherein a second one of the pair of connecting members is attached to the other of the pair of rods such that the second connecting member is swingably pivotable on the second axis that is parallel to the first axis, wherein the biasing member is a torsion coil spring having one end attached to the first connecting member such that the spring is pivotable on a third axis that is parallel to the first axis and having the other end attached to the second connecting member such that the spring is pivotable on a fourth axis that is parallel to the second axis, and wherein both ends of the torsion coil spring draw each other to place all of the first, second, third, and fourth axes on a straight line, thereby pulling the pair of rods closer to each other, so that the ball is retained in the socket at each of the ball joints.

9. A parallel mechanism comprising:

arms each being swingably pivotable on a base end portion and each including a pair of rods aligned in parallel in a longitudinal direction thereof;

a bracket having an end effecter attached thereto, the bracket being retained between the pair of rods at a free end portion of the arms;

a pair of ball joints for displaceably connecting the bracket with the arms, the ball joints each including
a first joint element having a ball and provided to one of the pair of rods and the bracket, and
a second joint element having a socket for retaining the ball and provided to the other of the pair of rods and the bracket;

a connecting member for connecting the parallel rods, and for restricting rotation of each rod about an axis that is parallel to the longitudinal direction of the rod; and a biasing member for providing a biasing force for retaining the balls in the sockets at the ball joints, wherein the biasing force of the biasing member is limitedly effected only in one direction, wherein the connecting member includes:

a first connecting member attached to one of the pair of rods such that the first connecting member is swingably pivotable on a first axis that is perpendicular to the longitudinal direction of the rod;

a second connecting member attached to the other of the pair of rods such that the second connecting member is swingably pivotable on a second axis that is parallel to the first axis;

a piston rod portion fixed to the first connecting member; and a cylinder portion fixed to the second connecting member, the cylinder portion having the piston rod portion inserted there into movably in the axial direction of the piston rod portion, and wherein the biasing member is a coil spring provided to wrap around the circumference of the piston rod port ion, the coil spring being compressed to pull the pair of rods closer to each other, thereby retaining the ball in the socket at each of the ball joints.

10. A parallel mechanism comprising:

arms each being swingably pivotable on a base end portion and each including a pair of rods aligned in parallel in a longitudinal direction thereof;

a bracket having an end effecter attached thereto, the bracket being retained between the pair of rods at a free end portion of the arms;

a pair of ball joints for displaceably connecting the bracket with the arms, the ball joints each including
a first joint element having a ball and provided to one of the pair of rods and the bracket, and
a second joint element having a socket for retaining the ball and provided to the other of the pair of rods and the bracket;

a connecting member for connecting the parallel rods, and for restricting rotation of each rod about an axis that is parallel to the longitudinal direction of the rod; and a biasing member for providing a biasing force for retaining the balls in the sockets at the ball joints, wherein the biasing force of the biasing member is limitedly effected only in one direction, wherein the connecting member includes:

a portion attached to one of the pair of rods such that the portion is swingably pivotable on the first axis that is perpendicular to the longitudinal direction of the rod; and a portion attached to the other of the pair of rods such that the portion is swingably pivotable on the second axis that is parallel to the first axis, wherein provided at the ball joints are:

the second joint elements each being fixed to each rod; and the first joint elements each including a cylinder portion fixed to the bracket, and a piston rod portion inserted into the cylinder portion movably in an axial direction thereof, and wherein the biasing member is a coil spring contained in a cylinder chamber of the cylinder portion, the coil spring expanding to bias the first joint elements away from each other, thereby retaining the ball in the socket at each of the ball joints.

11. A parallel mechanism comprising:

arms each being swingably pivotable on a base end portion and each including a pair of rods aligned in parallel in a longitudinal direction thereof;

a bracket having an end effecter attached thereto, the bracket being retained between the pair of rods at a free end portion of the arms;

a pair of ball joints for displaceably connecting the bracket with the arms, the ball joints each including
a first joint element having a ball and provided to one of the pair of rods and the bracket, and
a second joint element having a socket for retaining the ball and provided to the other of the pair of rods and the bracket;

a connecting member for connecting the parallel rods, and for restricting rotation of each rod about an axis that is parallel to the longitudinal direction of the rod; and a biasing member for providing a biasing force for retaining the balls in the sockets at the ball joints, wherein the biasing force of the biasing member is limitedly effected only in one direction, wherein the connecting member includes:

a portion attached to one of the pair of rods such that the portion is swingably pivotable on the first axis that is perpendicular to the longitudinal direction of the rod; and a portion attached to the other of the pair of rods such that the portion is swingably pivotable on the second axis that is parallel to the first axis, wherein the first and second joint elements are provided at the ball joints, the first joint element being fixed to the bracket, the second joint element being fixed to the rod, and wherein at least one of the second joint elements fixed to the pair of rods is provided with the socket in a movable manner such that the socket is biased by the coil spring serving as a biasing member, the coil spring expanding to push the movable socket upon the ball, thereby retaining the ball in the socket at each of the ball joints.

12. A parallel mechanism comprising:

arms each being swingably pivotable on a base end portion and each including a pair of rods aligned in parallel in a longitudinal direction thereof;

a bracket having an end effecter attached thereto, the bracket being retained between the pair of rods at a free end portion of the arms;

a pair of ball joints for displaceably connecting the bracket with the arms, the ball joints each including
 a first joint element having a ball and provided to one of the pair of rods and the bracket, and
 a second joint element having a socket for retaining the ball and provided to the other of the pair of rods and the bracket;

a connecting member for connecting the parallel rods, and for restricting rotation of each rod about an axis that is parallel to the longitudinal direction of the rod; and a biasing member for providing a biasing force for retaining the balls in the sockets at the ball joints, wherein the biasing force of the biasing member is limitedly effected only in one direction, wherein the connecting member includes:

a first connecting member attached to one of the pair of rods such that the first connecting member is swingably pivotable on the first axis that is perpendicular to the longitudinal direction of the rod;

a second connecting member attached to the other of the pair of rods such that the second connecting member is swingably pivotable on the second axis that is parallel to the first axis;

a piston rod portion fixed to the first connecting member; and a cylinder portion fixed to the second connecting member, the cylinder portion having the piston rod portion inserted thereinto movably in an axial direction thereof, and wherein the biasing member is a coil spring provided to wrap around the circumference of the piston rod portion, the coil spring expanding to pull the pair of rods closer to each other, thereby retaining the ball in the socket at each of the ball joints.

13. A parallel mechanism comprising:

arms each being swingably pivotable on a base end portion and each including a pair of rods aligned in parallel in a longitudinal direction thereof;

a bracket having an end effecter attached thereto, the bracket being retained between the pair of rods at a free end portion of the arms;

a pair of ball joints for displaceably connecting the bracket with the arms, the ball joints each including
 a first joint element having a ball and provided to one of the pair of rods and the bracket, and
 a second joint element having a socket for retaining the ball and provided to the other of the pair of rods and the bracket;

a connecting member for connecting the parallel rods, and for restricting rotation of each rod about an axis that is parallel to the longitudinal direction of the rod; and a biasing member for providing a biasing force for retaining the balls in the sockets at the ball joints, wherein the biasing force of the biasing member is limitedly effected only in one direction, wherein the connecting member includes a pair of connecting members supported such that the pair of connecting members is swingably pivotable relative to each other in a direction that is perpendicular to the longitudinal direction of the pair of rods;

wherein a first one of the pair of connecting members is attached to one of the pair of rods such that the first connecting member is swingably pivotable on the first axis that is parallel to a direction that is perpendicular to the longitudinal direction of the rod, wherein a second one of the pair of connecting members is attached to the other of the pair of rods such that the second connecting member is swingably pivotable on the second axis that is parallel to the first axis, wherein the biasing member is a coil spring having one end attached to the first connecting member such that the spring can swing around a third axis that is parallel to the first axis and the other end attached to the second connecting member such that the spring can swing around a fourth axis that is parallel to the second axis, and wherein the coil spring is compressed to place all of the first, second, third, and fourth axes on a straight line, and thereby pulls the pair of rods closer to each other, so that the ball is retained in the socket at each of the ball joints.

14. A parallel mechanism comprising:

arms each being swingably pivotable on a base end portion and each including a pair of rods aligned in parallel in a longitudinal direction thereof;

a bracket having an end effecter attached thereto, the bracket being retained between the pair of rods at a free end portion of the arms;

a pair of ball joints for displaceably connecting the bracket with the arms, the ball joints each including
 a first joint element having a ball and provided to one of the pair of rods and the bracket, and
 a second joint element having a socket for retaining the ball and provided to the other of the pair of rods and the bracket;

a connecting member for connecting the parallel rods, and for restricting rotation of each rod about an axis that is parallel to the longitudinal direction of the rod; and a biasing member for providing a biasing force for retaining the balls in the sockets at the ball joints, wherein the biasing force of the biasing member is limitedly effected only in one direction, wherein the connecting member includes a pair of connecting members supported such that the connecting members is swingably pivotable relative to each other in a direction that is perpendicular to the longitudinal direction of the pair of rods, wherein a first one of the pair of connecting members is attached to one of the pair of rods such that the first connecting member is swingably pivotable on the first axis that is parallel to a direction that is perpendicular to the longitudinal direction of the rod, wherein a second one of the pair of connecting members is attached to the other of the pair of rods such that the second connecting member is swingably pivotable on the second axis that is parallel to the first axis, wherein the biasing member is a torsion coil spring having one end attached to the first connecting member such that the spring is pivotable on a third axis that is parallel to the first axis and having the other end attached to the second connecting member such that the spring is pivotable on a fourth axis that is parallel to the second axis, and wherein both ends of the torsion coil spring draw each other to place all of the first, second, third, and fourth axes on a straight line, thereby pulling the pair of rods closer to each other, so that the ball is retained in the socket at each of the ball joints.

* * * * *